United States Patent [19]

Gaither et al.

[11] 4,034,679

[45] July 12, 1977

[54] AUTOMATED PIPELINE CRAWLER

[76] Inventors: Teddy W. Gaither, R.R. 8, Box 387V, Tulsa, Okla. 74106; James E. Ford, 11925 E. 1st, Tulsa, Okla. 74128

[21] Appl. No.: 678,040

[22] Filed: Apr. 19, 1976

Related U.S. Application Data

[63] Continuation-in-part of Ser. No. 524,488, Nov. 18, 1974, abandoned.

[51] Int. Cl.² .......................................... B62D 61/02
[52] U.S. Cl. .......................... 104/138 R; 105/365; 180/1 R; 180/20; 180/30; 280/92
[58] Field of Search ............ 180/1 R, 21, 65 R, 20, 180/30; 104/138 R, 138 G; 105/365; 254/134.5; 280/92, 97

[56] References Cited

U.S. PATENT DOCUMENTS

| 1,116,644 | 11/1914 | Supan | 280/97 |
| 2,067,546 | 1/1937 | Rocher | 180/121 |
| 2,485,770 | 10/1949 | Place | 180/21 |
| 2,533,752 | 12/1950 | Alamagny | 180/21 |
| 3,190,387 | 6/1965 | Dow | 180/65 R |
| 3,547,040 | 12/1970 | Baran | 104/138 G |
| 3,566,985 | 3/1971 | Triplett | 180/65 R |
| 3,700,059 | 10/1972 | Sutton | 180/21 |

FOREIGN PATENT DOCUMENTS

| 441,231 | 4/1925 | Germany | 104/138 G |

Primary Examiner—Joseph F. Peters, Jr.
Assistant Examiner—Jack D. Rubenstein
Attorney, Agent, or Firm—Head, Johnson & Chafin

[57] ABSTRACT

A powered pipeline crawler comprising a personnel carrier having an outer configuration complementary to the inner cross-sectional configuration of a pipeline and provided with suitable wheels for longitudinal movement through a pipeline. In addition, power means is provided for the carrier for propelling the device through the pipeline upon the control of the personnel being carried thereby.

7 Claims, 4 Drawing Figures

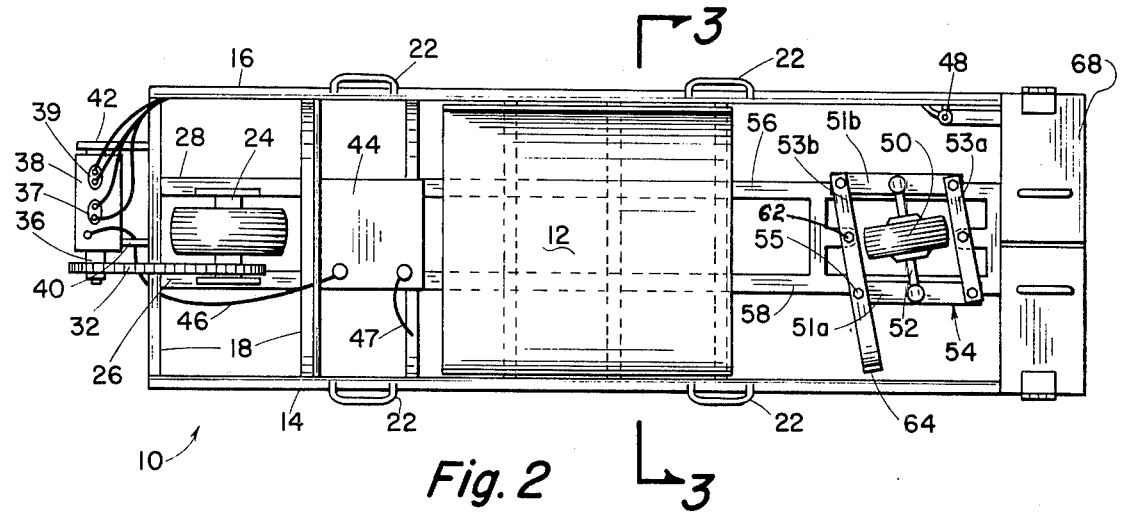
Fig. 2
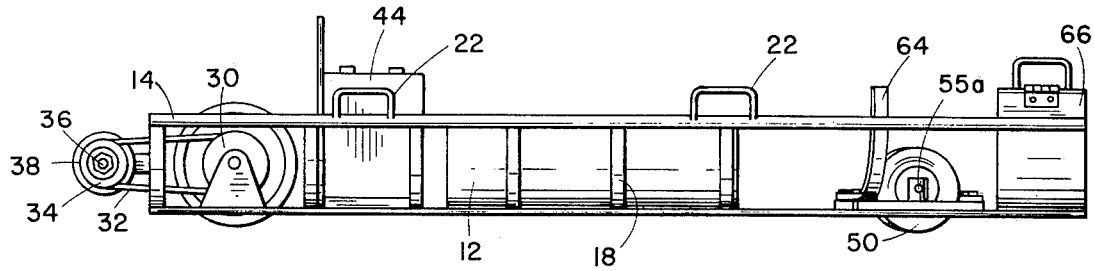
Fig. 1
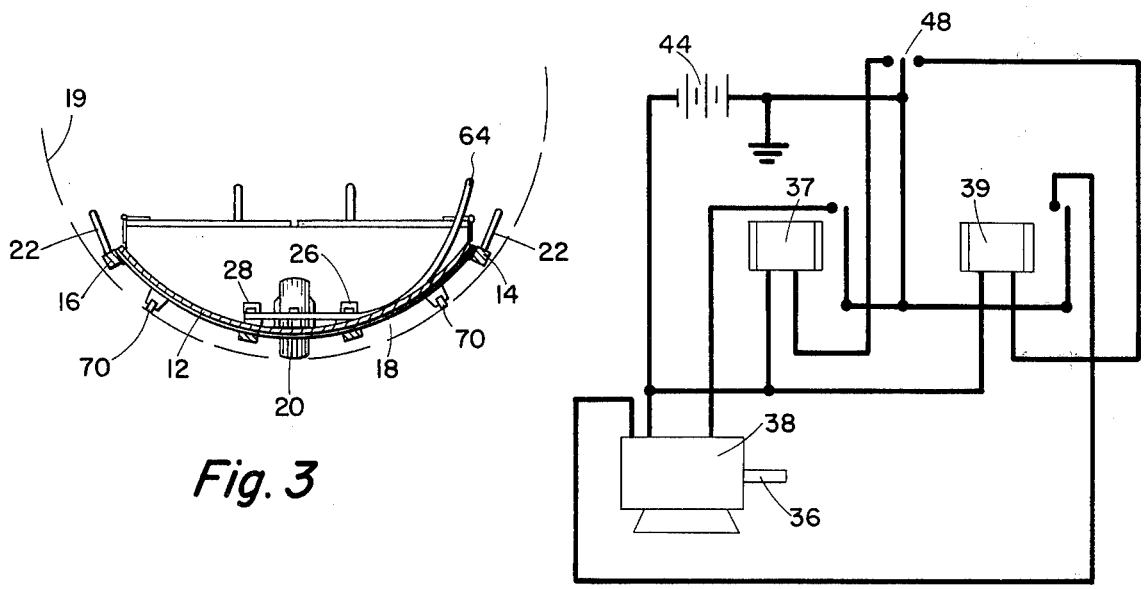
Fig. 3
Fig. 4

AUTOMATED PIPELINE CRAWLER

CROSS-REFERENCE TO RELATED APPLICATION

This application is a continuation-in-part application of co-pending application Ser. No. 524,488, filed Nov. 18, 1974, and entitled "AUTOMATED PIPELINE CRAWLER", now abandoned.

BACKGROUND OF THE INVENTION

1. Field of the Invention

This invention relates to improvements in personnel carrying devices and more particularly, but not by way of limitation, to a personnel carrier for propelling a person through a pipeline under his own control.

2. Description of the Prior Art

In the pipeline construction industry, and particularly in the construction of water lines, and the like, it is common practice to construct a length of the pipeline on the surface of the ground prior to laying the length of the line in a ditch and covering it up. This normally comprises welding of a plurality of pipe sections in end to end relation to provide the desired length for the preassembled pipeline section. When the individual sections of pipe have been welded together, the interior thereof is usually coated with a suitable protective coating material. The individual pipe sections are frequently internally coated at the steel fabrication plant, but the interior portions of the weld at each pipe joint must also be coated subsequent to the welding operation. The coating of the welded pipe sections prior to disposition thereof in the ditch for connection with the previously laid pipe is apparently not a great problem. However, when the new length of pipe is welded to the previously laid pipe, the internal portion of the newly welded pipe joint must be coated. Whereas there are presently available devices which may be "run" into the pipeline for applying the coating material to the welded joint, it is extremely important that the coating operation be efficient and thorough. Accordingly, it is very desirable to provide a manual inspection of the coating operation. Since the newly attached section of pipe is usually as much as eight hundred feet in length, it is somewhat difficult for a workman to reach the site of the pipe joints for inspecting the coating, or for actually performing the coating operation manually.

SUMMARY OF THE INVENTION

The present invention contemplates a powered pipeline crawler for transporting a man or person longitudinally through the pipeline from the open end thereof to the site of the welded pipe joint. The device comprises a substantially cradle-shaped carrying platform having the lower portion thereof arcuate complementary to the cross-sectional configuration of the pipeline. A plurality of wheels are provided on the carrier for engagement with the inner periphery of the pipe to roll longitudinally therealong at the direction and control of the person being transported by the device. Power means is provided on the carrier, operable by the person using the device for advancing the device through the pipeline to the site of the pipe joint to be coated and/or inspected, and for backing the device out of the pipeline. Of course, suitable ropes or cables may be attached to the device whereby the device may be manually pulled from the pipeline in the event of failure of the power means. The novel apparatus is simple and efficient in operation and economical and durable in construction.

BRIEF DESCRIPTION OF THE DRAWINGS

FIG. 1 is a plan view of an automated pipeline crawler embodying the invention.

FIG. 2 is a side elevational view of a pipeline crawler embodying the invention.

FIG. 3 is a sectional view taken on line 303 of FIG. 1, with a portion of the inner periphery of a pipeline being shown in broken lines for purposes of illustration.

FIG. 4 is an electrical circuit diagram of the power means for a pipeline crawler embodying the invention.

DESCRIPTION OF THE PREFERRED EMBODIMENT

Referring to the drawings in detail, reference character 10 generally indicates a pipeline crawler comprising a main support cradle 12 of a substantially semi-circular cross-sectional configuration, but not limited thereto, for supporting the body of the person utilizing the device 10. The opposite side edges of the cradle 12 are preferably supported by a pair of longitudinally extending angle members or rods 14 and 16, or the like, and a plurality of longitudinally spaced arcuate support or cross members 18 are secured to the rod members 14 and 16 to provide support and rigidly for the apparatus 10. As particularly shown in FIG. 3, the cross members 18 are preferably of an arcuate configuration complementary to the cross-sectional configuration of the inner periphery of the pipe 19 indicated in broken lines. In addition, a plurality of suitable handle members 22 may be welded or otherwise secured to the angle or rod members 14 and 16 for facilitating manipulation of the device 10 during transport thereof, and the like.

A driving wheel 20 is suitably keyed or otherwise secured to a hub member 24 which is journalled between a pair of spaced strap members 26 and 28 in any suitable manner. The strap members 26 and 28 may be welded or otherwise secured between a pair of spaced cross members 18 as particularly shown in FIG. 1. It is preferable that the wheel 20 be disposed in the proximity of one end of the apparatus 10, but not limited thereto. A gear or pulley member 30 is keyed or otherwise secured to the hub members 24 for receiving a chain or belt 32 therearound. The belt 32 extends between the gear or pulley 30 and a complementary gear or pulley 34 secured to the drive shaft 36 of a suitable high torque electric motor 38, or the like. The motor 38 as shown herein is a one and one-half volt electric car or truck starter and may be mounted on one of the cross members 18 by suitable support bracket members 40 and 42. The motor 38 is preferably provided with two solenoids 37 and 39, with one solenoid being for a forward direction of movement of the apparatus 10 and the other solenoid being for a reverse direction of movement as will be hereinafter set forth. Actuation of the motor 38 causes the drive shaft 36 to rotate about its longitudinal axis for rotating the gear or pulley 34. Rotation of the pulley 34 is transmitted to the gear or pulley 30 through the belt or chain 32, and of course, rotation of the gear 30 is transmitted to the wheel 20 through the hub 24.

A suitable power supply, such as a battery 44, is mounted between a pair of adjacent cross members 18 as particularly shown in FIG. 1, and is electrically connected with the motor 38 in any well known manner for supplying power therefor. As shown herein a "hot" wire 46 may be connected between the battery 44 and the motor 38, and a ground wire or cable 47 may be connected between the battery 44 and "ground" as is well known. A suitable on-off switch 48 may be mounted on one of the angle or rod members, such as the member 16, in any convenient location for operation thereof by the person using the apparatus 10, and is electrically connected between the battery 44 and the motor 38 for a purpose as will be hereinafter set forth and as shown in FIG. 4.

A steering wheel 50 is suitable journalled on a rod or axle 52 mounted in a steering assembly frame 54 spaced from the wheel 20 as clearly shown in FIGS. 1 and 2. The steering assembly frame assembly 54 is independently mounted or secured between a pair of spaced longitudinally extending support rods or straps 56 and 58 which preferably extend longitudinally throughout the length of the apparatus 10, and which are secured to the cross members 18 in any suitable or well known manner. The frame 54 is of a substantially rectangular configuration and comprises a first pair of spaced mutually parallel arms 51a and 51b each having the opposite ends thereof pivotally secured to a second pair of spaced mutually parallel arms 53a and 53b in any suitable manner, such as by pivot pins 55. In addition, each arm 53a and 53b is suitably pivotally secured at the centers thereof, fore and aft, or front and rear, as indicated at 62, thus securing the assembly 54 between the rods 56 and 58. Also, the opposite ends of the axle 52 are suitably journalled on the arms 51a and 51b as shown at 55a.

A suitable steering handle 64 is carried by or secured to the steering frame assembly 54 and may be manipulated by the operator of the device 10 for steering thereof through control of the wheel 50, as is well known. Thus, when the handle 64 is moved in one direction, such as toward the battery 44, the frame assembly will pivot on one direction about the center point pivot connections 62, since each corner of the rectangle is pivotal, and cause the axle 52 of the wheel 50 to assume an angular position with respect to the longitudinal axis of the apparatus 10. Movement of the handle 64 in an opposite direction will pivot the frame assembly 54 in an opposite direction for turning the axle 52 in an opposite direction.

A vessel or container 66 of any suitable type is removably secured to at least one of the cross members 18 and may be provided with suitable hinged cover members 68 for facilitating access to the interior thereof. The coating material (not shown), or the like, to be applied to the interior walls of the pipeline at the pipe joint may be stored in the vessel 66, and when not in use, the vessel 66 may be removed for cleaning and the like.

In addition to the wheels 20 and 50, it is preferable to provide a plurality of canted outrigger wheels 70 journalled on the outer periphery of the cross members 18 for engaging the inner periphery of the pipe 19 and crolling longitudinally therealong in order to stabilize the device 10 against rolling or turning about its own longitudinal axis during use in a pipeline. Any desired number of the wheels 70 may be provided with any suitable spacing therefor as required.

In operation, the apparatus 10 may be disposed within a pipeline by inserting thereof through the open end of the pipeline as is well known. The operator of the apparatus 10 may lie, sit or otherwise position himself on the cradle member 12 and preferably disposes himself in such a manner that the on-off switch 48 and steering handle 64 are in a convenient orientation for actuation thereof. When the on-off switch 48 is moved to an "on" position for energizing the "forward" solenoid of the motor 38, electrical energy is transmitted to the motor 38 which causes the shaft 36 to rotate about its longitudinal axis in one direction for producing forward movement of the apparatus 10. This rotation is transmitted to the gear or pulley 30 through the pulley or gear 34 and belt 32. As hereinbefore set forth, the gear 30 is keyed or otherwise secured on the hub 24 for simultaneous rotation therebetween and the rotation of the gear 30 is transmitted to the wheel 20 through the hub 24. Rotation of the wheel 20 drives the apparatus 10 longitudinally through the pipeline as long as the switch 48 is in the "on" position. As the apparatus 10 moves through the pipeline, any necessary steering thereof may be accomplished manually by the operator of the apparatus through the steering handle 64 and steering assembly frame 54.

When the apparatus 10 and operator arrive at the site within the pipeline wherein a coating operation or inspection operation is to take place, the switch 48 may be moved to the "off" position, which de-energizes the motor 38, and stops the forward movement of the apparatus. The operator may then perform the required operation on the interior of the pipeline in the usual manner.

In order to return to the open end of the pipeline, the switch 48 may be placed in the "on" position for energizing the "reverse" solenoid of the motor 38, and the shaft 36 will be rotated in an opposite direction for reversing the direction of rotation for the wheel 20. The wheel 20 will then pull the apparatus 10 through the pipeline in a reverse direction whereby the operator of the apparatus may "drive" himself to the open end of the pipeline for release therefrom.

It will be apparent that suitable cables (not shown), or the like, may be secured to the apparatus 10 whereby one end of the cables may be fastened to or remain at the open end of the pipeline while the other end of the cable may be secured to the apparatus 10. In the event of any power failure, or the like, the apparatus 10 and operator may be manually pulled through the pipeline in said reverse direction for removing the apparatus and operator from the pipeline, and assuring no accidental trapping of the operator in the pipeline.

In addition, whereas the power supply for the apparatus 10 as shown herein comprises electric battery powered starter-type motor means, it will be apparent that a gasoline engine, or the like, may be provided for driving the apparatus through the pipeline. However, as a practical matter, is may be found that the exhaust fumes from such motors may be undesirable in many instances.

From the foregoing it will be apparent that the present invention provides a novel pipeline crawler wherein an operator may ride longitudinally into and through a pipeline for coating and/or inspecting an interior pipe joint and return from the open end of the pipeline. The novel apparatus comprises a personnel carrier member mounted on a framework having an outer periphery of an arcuate configuration complementary to the cross-sectional configuration of the inner periphery of the pipe. A driving wheel is operably connected with a power source for driving the apparatus longitudinally through the pipeline at the control of the operator, and steering wheel means is provided for actuation by the operator of the apparatus as required.

Whereas the present invention has been described in particular relation to the drawings attached hereto, it should be understood that other and further modifications, apart from those shown or suggested herein, may be made within the spirit and scope of this invention.

What is claimed is:

1. A powered pipeline crawler comprising support frame means having upper elongated elements defining a substantially flat plane and lower transverse elements of an arcuate configuration complementary to the cross sectional configuration of the pipeline, personnel carrier means carried by the support frame means and being of an arcuate cross sectional configuration whereby the support frame means surrounds a portion of the personnel disposed on said personnel carrier means, driving wheel means journalled on the support frame means, power means operably connected with the driving wheel means for transmitting rotation thereto, steering wheel means journalled on the support frame means for steering the crawler during longitudinal movement thereof through the pipeline, wherein said steering wheel means comprises a frame assembly pivotally secured to the support frame means, a steering wheel member journalled on said frame assembly and movable simultaneously therewith, and handle means carried by said frame assembly for facilitating manual pivoting of said frame assembly to control the position of said steering wheel member for steering of the crawler and wherein said frame assembly comprises a first pair of spaced mutually parallel arm members, a second pair of spaced mutually parallel arm members having the opposite ends pivotally secured to the opposite ends of said first pair of arm members, and means for pivotally securing one pair of said spaced members to said support frame assembly.

2. A powered pipeline crawler as set forth in claim 1 wherein the power means comprises battery means carried by the support frame means, high torque electric motor means carried by the support frame means, drive means operably connected between the motor means and the driving wheel means for transmitting rotation to the driving wheel means for moving the crawler longitudinally through the pipeline.

3. A powered pipeline crawler as set forth in claim 2 wherein the motor means includes a forward solenoid and a reverse solenoid to provide selective forward and reverse directions of movement for the crawler through the pipeline.

4. A powered pipeline crawler as set forth in claim 3 and including switch means electrically connected between the battery means and the motor means for selective energization of the forward and reverse solenoids.

5. A powered pipeline crawler as set forth in claim 1 wherein the steering wheel means comprises a frame assembly mounted on the support frame means, a steering wheel journalled on the frame assembly, and said frame assembly is of substantially rectangular configuration having each corner thereof pivotal and having the front center and rear center thereof secured pivotally to the support frame means.

6. A powered pipeline crawler as set forth in claim 1 and including outrigger wheel means journalled on the support frame means for engagement with the inner periphery of the pipeline for stabilization of the crawler during movement thereof through the pipeline.

7. A powered pipeline crawler comprising support frame means, personnel carrier means carried by the support frame means, driving wheel means journalled on the support frame means, power means operably connected with the driving wheel means for transmitting rotation thereto, steering wheel means journalled on the support frame means for steering the crawler during longitudinal movement thereof through the pipeline, and wherein the outer periphery of the support frame means is of an arcuate configuration complementary to the cross sectional configuration of the inner periphery of the pipeline, and wherein the steering wheel means comprises substantially rectangular frame means having the corners thereof pivotal and the center front and rear thereof pivotally secured to the support frame means, and a steering wheel journalled on said frame means and movable therewith for steering of the crawler.

* * * * *